(12) United States Patent
Hotta et al.

(10) Patent No.: US 7,219,657 B2
(45) Date of Patent: May 22, 2007

(54) FUEL ROUTING STRUCTURE FOR A V-TYPE ENGINE

(75) Inventors: Kazuhito Hotta, Wako (JP); Hiraku Minato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/207,576

(22) Filed: Aug. 19, 2005

(65) Prior Publication Data

US 2006/0042601 A1    Mar. 2, 2006

(30) Foreign Application Priority Data

Aug. 26, 2004    (JP)    ............................. 2004-246196

(51) Int. Cl.
*F02M 55/02*    (2006.01)
*F02B 75/22*    (2006.01)

(52) U.S. Cl. ................. 123/468; 123/54.4; 123/184.31

(58) Field of Classification Search ................ 123/468, 123/469, 470, 456, 54.4, 184.31, 184.34
See application file for complete search history.

(56) References Cited

U.S. PATENT DOCUMENTS

| | | | | |
|---|---|---|---|---|
| 5,577,477 | A * | 11/1996 | Katoh | 123/456 |
| 6,305,354 | B1 * | 10/2001 | Kato | 123/456 |
| 6,655,337 | B2 * | 12/2003 | Hirano et al. | 123/184.31 |
| 7,086,364 | B2 * | 8/2006 | Udono | 123/184.21 |
| 7,104,236 | B2 * | 9/2006 | Ishikawa et al. | 123/184.31 |
| 2002/0170518 | A1 * | 11/2002 | Hirano et al. | 123/184.31 |
| 2005/0045147 | A1 * | 3/2005 | Ishikawa et al. | 123/336 |
| 2005/0066926 | A1 * | 3/2005 | Ishikawa et al. | 123/184.34 |
| 2005/0188959 | A1 * | 9/2005 | Udono | 123/470 |

FOREIGN PATENT DOCUMENTS

JP    2000-204969    7/2000

* cited by examiner

*Primary Examiner*—Mahmoud Gimie
(74) *Attorney, Agent, or Firm*—Carrier, Blackman & Associates, P.C.; William D. Blackman; Joseph P. Carrier

(57) ABSTRACT

A fuel routing structure for use in a vehicle having a V-type engine is provided. The structure has fewer parts, is compact, and facilitates ease of assembly and maintenance for a vehicle where fuel injection valves are attached to an intake manifold, which contains an intake passage communicating with intake ports of a pair of cylinder banks. Each fuel injection valve is attached to an upper part of the intake manifold, so that center lines of the fuel injection valves corresponding to both banks are crossed at an intersection over the intake manifold when a vehicle is viewed from the side. A fuel rail is provided with a fuel passage pipe, the axis of which is arranged in the vicinity of the intersection of the center lines of the fuel injection valves. The axis of the fuel passage pipe may be parallel to the crankshaft and may extend linearly and connected to all the fuel injection valves.

14 Claims, 8 Drawing Sheets

FUEL ROUTING STRUCTURE FOR A V-TYPE ENGINE

CROSS-REFERENCE TO RELATED APPLICATIONS

The present application claims priority under 35 USC 119 based on Japanese patent application No. 2004-246196, filed Aug. 26, 2004. The subject matter of this priority document is incorporated by reference herein.

BACKGROUND OF THE INVENTION

1. Field of the Invention

The present invention relates to a fuel and air routing structure for a V-type engine in a vehicle, the engine including cylinder heads provided in longitudinally arranged V-shaped banks. The fuel routing structure includes a member forming an intake passage communicating with intake ports of cylinder heads arranged between the pair of banks. Fuel injection valves for injecting fuel into the intake passage corresponding to each intake port are attached to the intake manifold.

2. Description of the Background Art

The fuel routing structure of a V-type engine for a vehicle in which fuel injection valves corresponding to each cylinder in cylinder heads of both banks are attached to an intake manifold common to a pair of banks and arranged between both banks is already known. An example of such a fuel routing structure is disclosed, for example, in JP-A No. 204969/2000.

However, in the above-mentioned conventional type fuel routing structure, both a fuel rail connected to the fuel injection valve corresponding to one bank and a fuel rail connected to the fuel injection valve corresponding to the other bank are required. Thus, a large number of parts are required for the structure, the fuel routing structure is intricate, and in addition, assembly and maintenance of the structure is troublesome.

The present invention is made in view of such a situation and the object is to provide fuel supply equipment of a V-type engine for a vehicle where fuel is supplied to each fuel injection valve by a structure in which the number of parts is reduced, which is compact and in addition, operability in assembly and in maintenance is enhanced.

SUMMARY OF THE INVENTION

To achieve the object, a first aspect of the invention is based upon a fuel routing structure of a V-type engine for a vehicle. The fuel routing structure includes a member forming an intake passage that communicates with intake ports of cylinder heads of the engine. In the engine, a pair of cylinder banks are provided forming a V shape and arranged longitudinally with respect to the vehicle. The intake manifold is arranged between the pair of banks. Fuel injection valves are attached to the intake manifold for injecting fuel into the intake passage corresponding to each intake port. The first aspect of the invention is characterized in that each fuel injection valve is attached to an upper part of the intake manifold so that center lines of the fuel injection valves corresponding to both banks are crossed at an intersection over the intake manifold when the vehicle is viewed from the side. In addition, a fuel rail provided with a fuel passage pipe, the axis of which is arranged in the vicinity of the intersection and which is parallel to a crankshaft and which is extended linearly, is connected to all the fuel injection valves in common and is directly attached to the intake manifold.

A second aspect of the invention, in addition to configuration in first aspect, is characterized in that the intake passage is configured by branched passages individually communicating with the intake ports. A common passage communicates with the branched passages in common, and the axis of the common passage is arranged in parallel with the axis of the fuel passage pipe.

The third aspect of the invention, in addition to configuration described with respect to the first or second aspects, is characterized in that a fuel inlet to which a fuel hose is to be connected is formed at one end of the fuel passage pipe so that the fuel inlet is open to one side of the vehicle.

Further, the fourth aspect of the invention, in addition to the configuration of the third aspect, is characterized in that the fuel rail is integrally provided with the fuel passage pipe. One end of the fuel passage pipe is a fuel inlet and the other end is closed. Plural fluid-tight valve connections connect the rear of each fuel injection valve to the fuel passage pipe.

According to the first aspect of the invention, since fuel is supplied to each fuel injection valve using the fuel rail, fewer parts are required and the fuel routing structure is made compact. That is, by connecting the single fuel rail common to the fuel injection valves to the fuel injection valves individually corresponding to the intake ports of the cylinder heads of both banks, and because the fuel rail is connected to each fuel injection valve over the intake manifold, operability in assembly and in maintenance is enhanced. In addition, because the fuel rail is directly attached to the intake manifold, a dedicated member for supporting the fuel rail is not required and the number of parts is further reduced.

According to the second aspect of the invention, the attachment and the detachment of the fuel rail to/from the intake manifold are facilitated and operability in assembly and in maintenance is further enhanced.

According to the third aspect of the invention, not only is the connection structure of the fuel hose to the fuel rail facilitated but work for connecting the fuel hose to the fuel rail can be facilitated.

Further, according to the fourth aspect of the invention, as fuel is not returned from the fuel rail, a return pipe is not required and the fuel routing structure is simplified and small in size.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE ILLUSTRATIVE EMBODIMENTS

Referring to the attached drawings, a number of selected illustrative embodiments of the present invention will be described below. It should be understood that only structures considered necessary for clarifying the present invention are described herein. Other conventional structures, and those of ancillary and auxiliary components of the system, are assumed to be known and understood by those skilled in the art.

Figure 4:
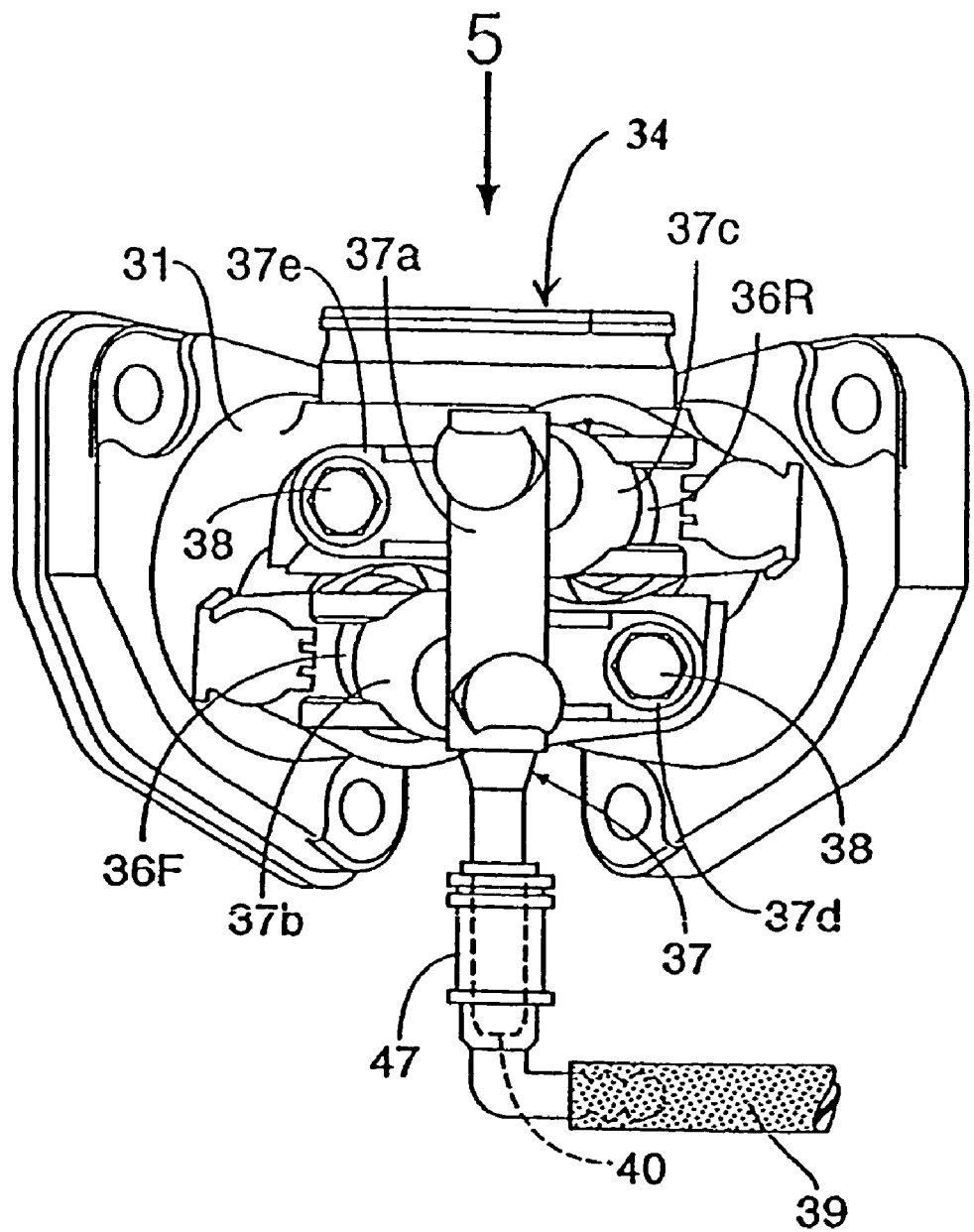
FIG. 4 is an enlarged top plan detail view of the fuel routing structure according to the first embodiment, showing the intake manifold and a fuel rail.
Figure 5:
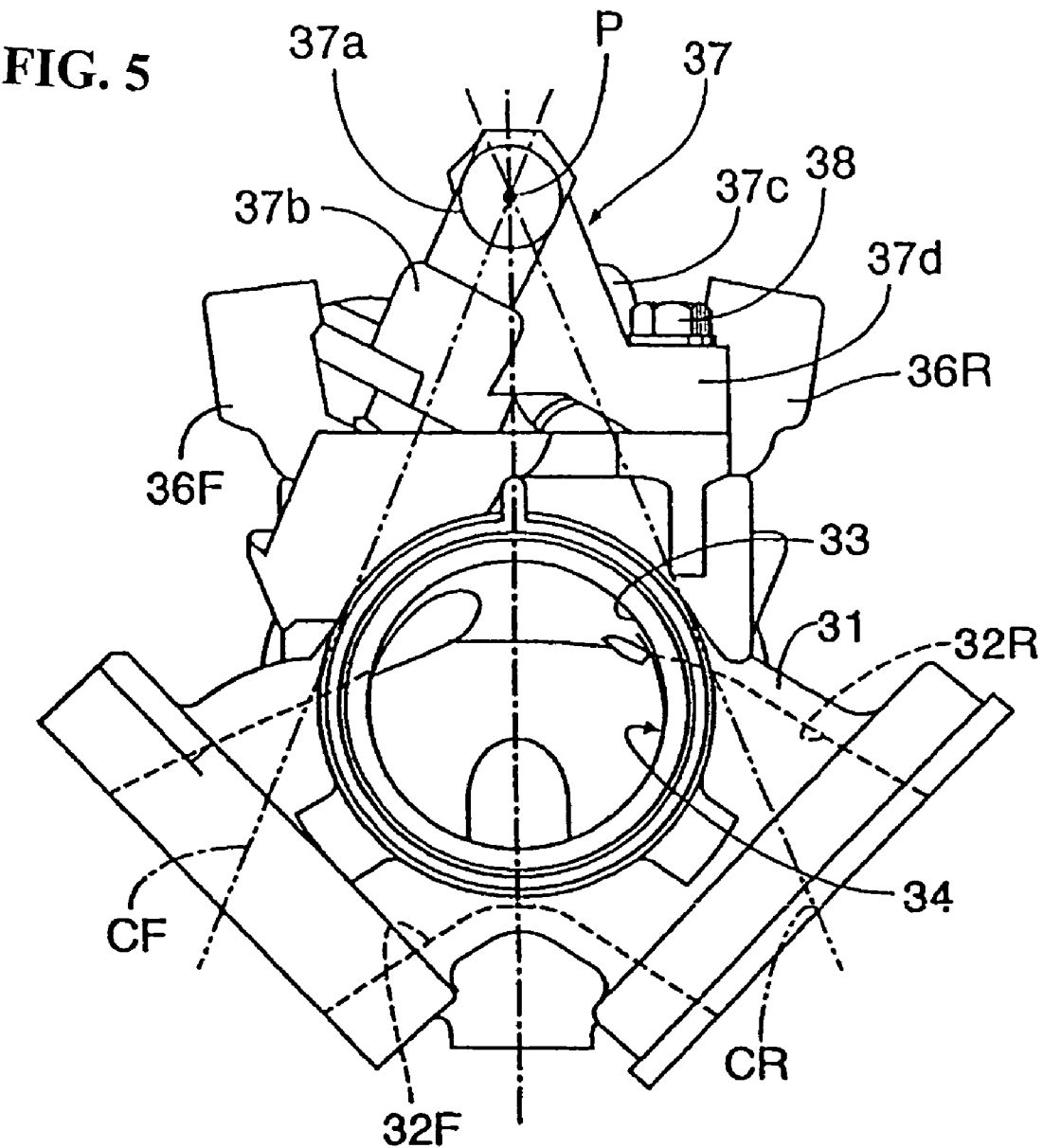
FIG. 5 is side plan view of the intake manifold and fuel routing structure of FIG. 4.
Figure 6:
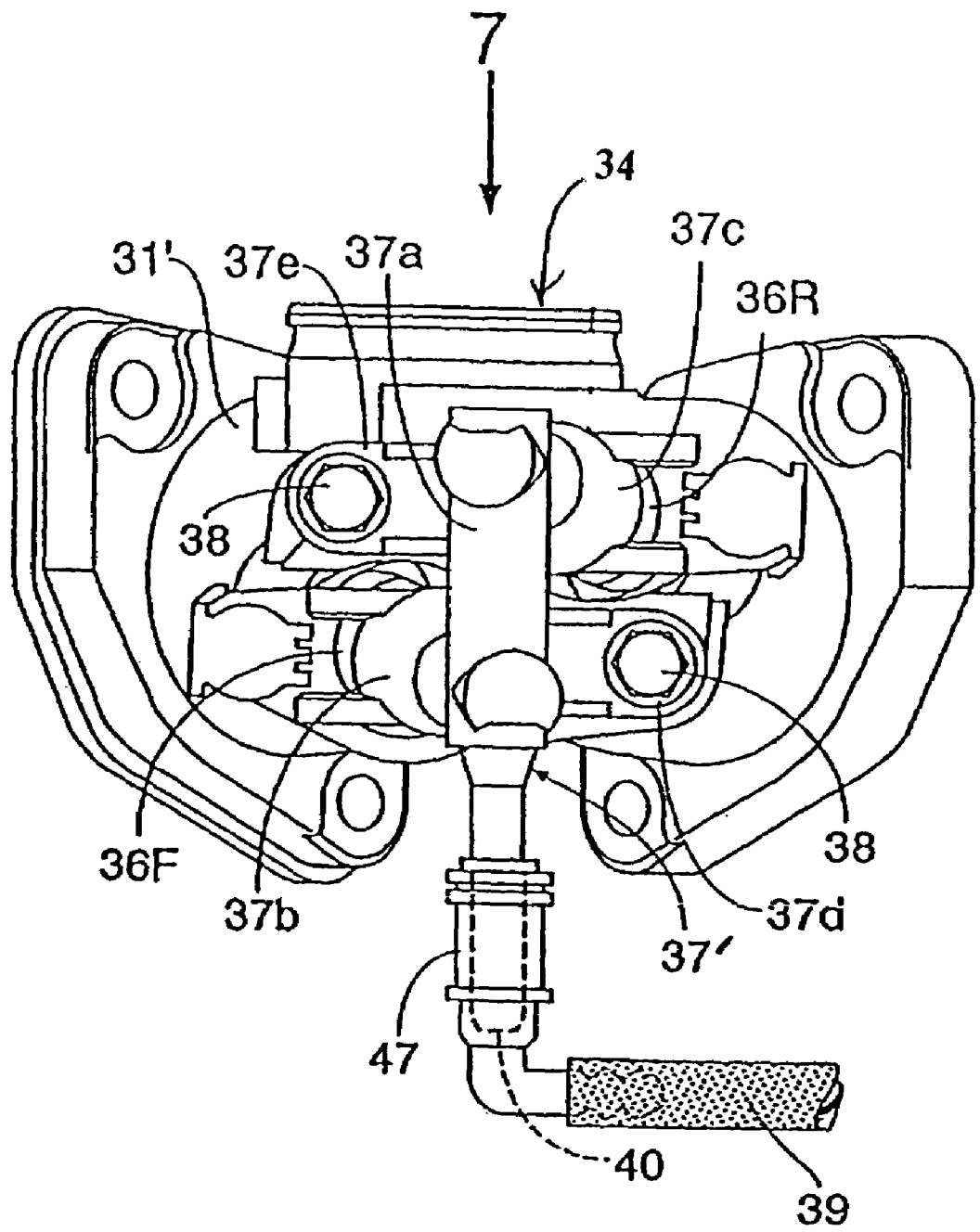
FIG. 6 is an enlarged top plan detail view of a fuel routing structure according to a second embodiment, showing an intake manifold and a fuel rail.
Figure 7:
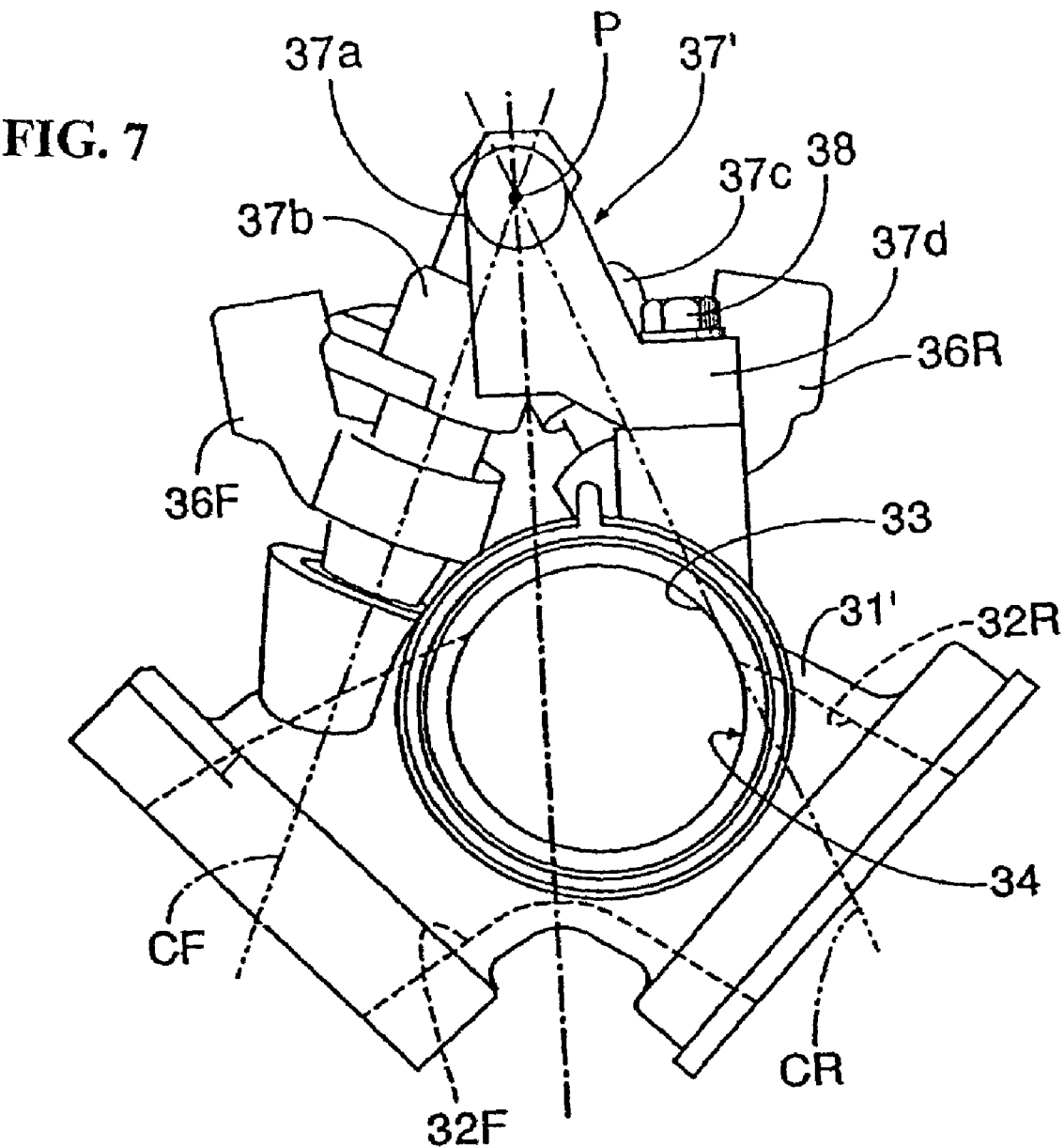
FIG. 7 is side plan view of the fuel routing structure of FIG. 6, as viewed in a direction shown by an arrow 7 in FIG. 6.
Figure 8:
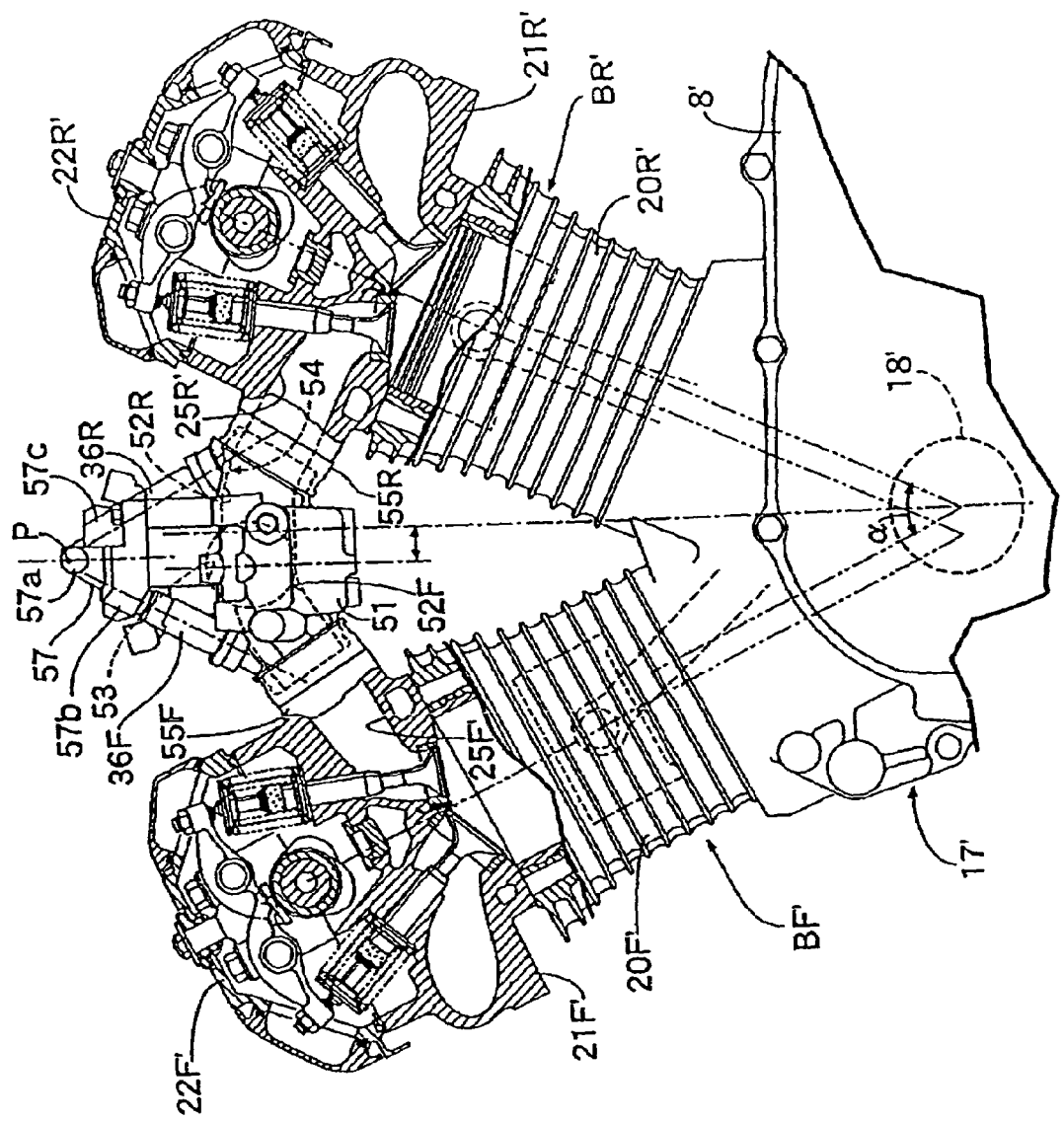
FIG. 8 is a side plan view, partly in cross-section and showing a main part of a V-type engine incorporating an fuel routing structure according to a third embodiment of the present invention.

FIGS. 1 to 5 show a fuel and air routing structure according to a first embodiment of the invention, FIGS. 6 and 7 show a fuel and air routing structure according to a second embodiment, and FIG. 8 shows a fuel and air routing structure according to a third embodiment.

Figure 1:
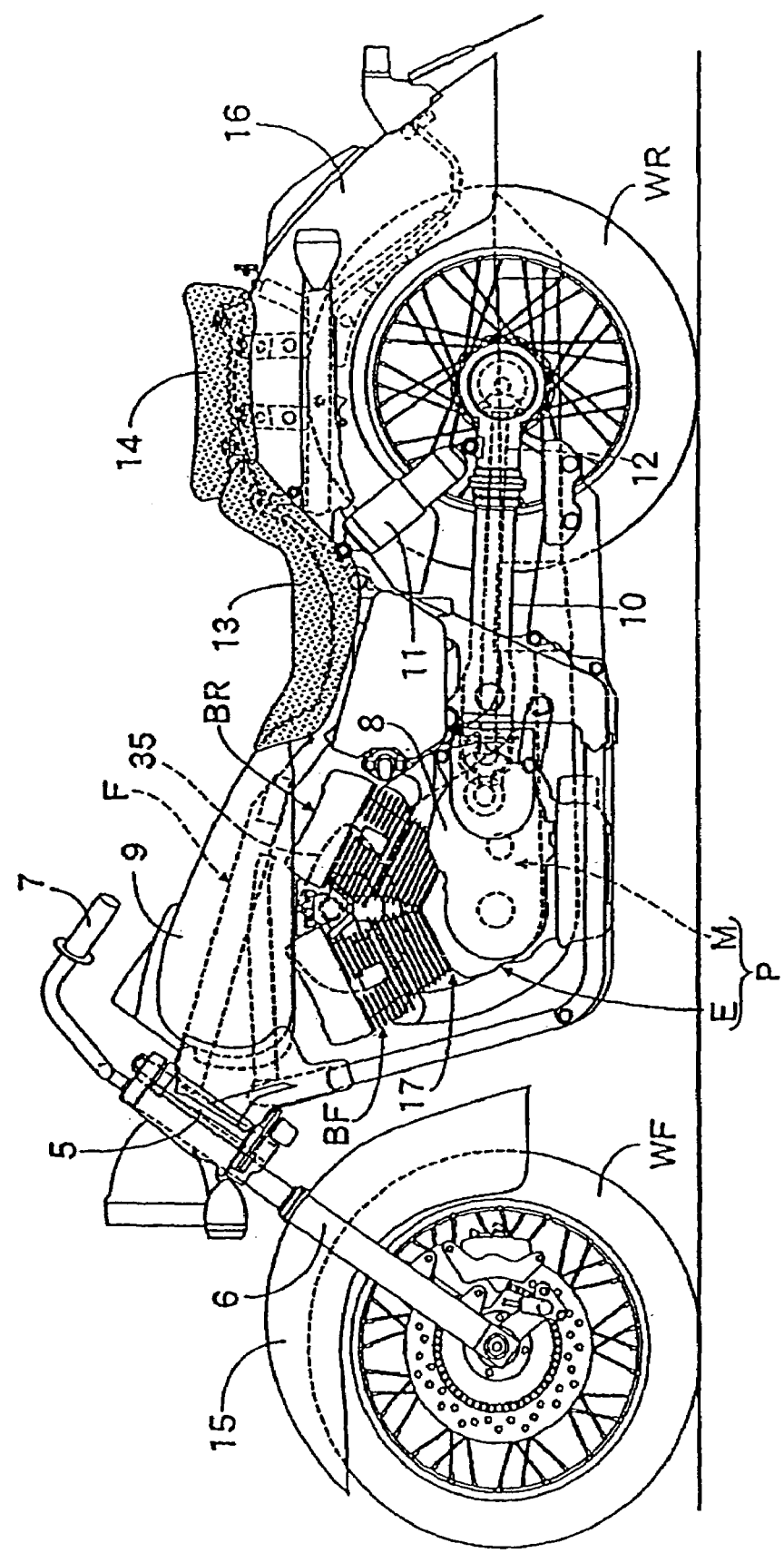
FIG. 1 is a side elevational view of a motorcycle including a V-type engine, which incorporates a fuel and air routing structure according to a first selected illustrative embodiment of the present invention.

A motorcycle 100 having a body frame F, with a V-type engine E mounted transversely thereon, is shown in side elevational view in FIG. 1. The engine E of the motorcycle incorporates an intake manifold 31 therein for routing fuel and air, according to a first embodiment of the present invention, as will be described in some detail herein. The motorcycle 100 includes a front fork 6 for rotatably supporting a front wheel WF at a terminal end thereof. The front fork 6 is pivotally supported by a head pipe 5 which is provided at the front end of the body frame F of the motorcycle 100, so that the front fork can be steered. A steering handlebar 7 is coupled to the upper end of the front fork 6. A power unit P includes an engine E and a transmission M housed in a crankcase 8 of the engine E. The power unit P is mounted in the front inside the body frame F. A fuel tank 9 is mounted in the front inside the body frame F so that the fuel tank covers the upper side of the engine E.

Each front end of a pair of right and left swing arms 10 extends longitudinally and is supported by the body frame F on the rear side of the power unit P so that each front end can be vertically rocked. A rear wheel WR is supported between the rear ends of both swing arms 10. A rear shock absorber 11 is inserted between the body frame F and the rear end of each swing arm 10. In addition, the left swing arm 10 of both swing arms 10 is formed cylindrically and a drive shaft 12 for transmitting motive power from the power unit P to the rear wheel WR is housed in the left swing arm 10.

A main seat 13 for seating a rider is attached to the body frame F on the rear side of the fuel tank 9, and a pillion seat 14 is attached to the body frame F on the rear side of the main seat 13.

A front fender 15, covering the front wheel WF from above, is attached to the front fork 6, and a rear fender 16, covering the rear wheel WR from above, is attached to the rear of the body frame F.

Figure 2:
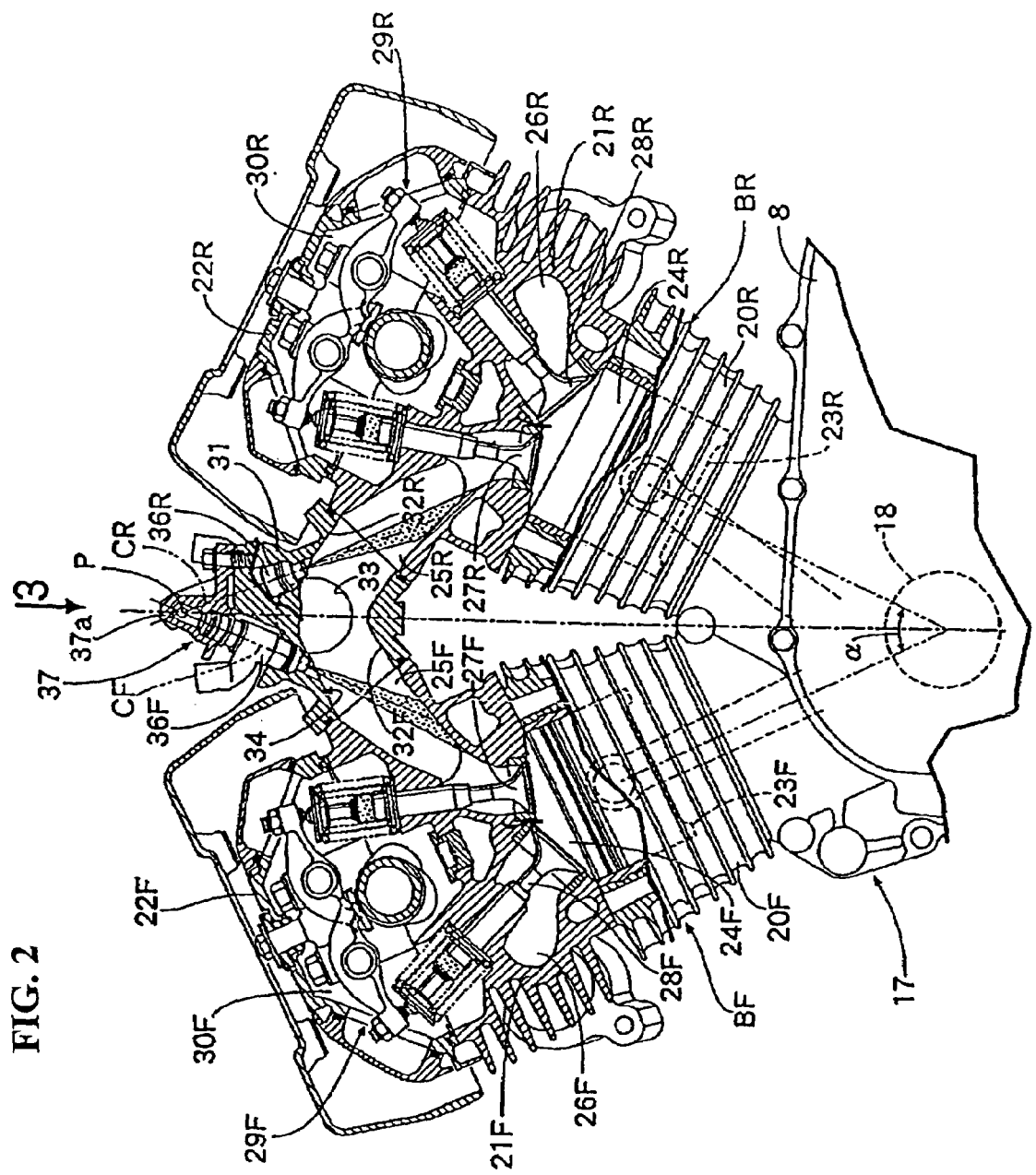
FIG. 2 is a side plan view, partly in cross-section, of a main part of the V-type engine of the motorcycle depicted in FIG. 1, showing the intake manifold positioned between the front and rear cylinder banks.

Also referring to FIG. 2, the body 17 of a transversely mounted V-type two-cylinder engine E is provided with a crankcase 8 supporting a crankshaft 18. As used herein, the term "transversely mounted", as used to describe the engine E, means that the engine is situated on the body frame F in a manner such that a central axis of the crankshaft 18 is oriented substantially transverse to a longitudinal axis of the body frame. The crankshaft 18 has an axis that extends in a cross direction (that is, from the left side of the vehicle to the right side, as viewed in the forward driving direction) of the body frame F. The engine E includes a pair of front and rear cylinder blocks 20F, 20R arranged in a V shape open upwardly and connected to the crankcase 8. The engine E also includes a respective cylinder head 21F, 21R connected to each cylinder block 20F, 20R, and a respective head cover 22F, 22R connected to the upper end of each cylinder head 21F, 21R. The engine E further includes a front bank BF formed by the cylinder block 20F, the cylinder head 21F and the head cover 22F, and a rear bank BR formed by the cylinder block 20R, the cylinder head 21R and the head cover 22R. The front and rear banks BF, BR cooperate to form the V-type engine, with the banks oriented at a small angle $\alpha$, of approximately 52° for example.

Pistons 23F, 23R are fitted into the cylinder blocks 20F, 20R so that the pistons can slide therein. Combustion chambers 24F, 24R which receive the tops of pistons 23F, 23R are formed between the cylinder block 20F and the cylinder head 21F in the front bank BF, and between the cylinder block 20R and the cylinder head 21R in the rear bank BR. Intake ports 25F, 25R that can communicate with the combustion chambers 24F, 24R are open on each inner wall of the cylinder heads 21F, 21R. Exhaust ports 26F, 26R that can communicate with the combustion chambers 24F, 24R are open on each outer wall of the cylinder heads 21F, 21R. In addition, each pair of intake valves 27F, 27R for controlling the communication and the cutoff with/from the combustion chambers 24F, 24R of the intake ports 25F, 25R are arranged in the cylinder heads 21F, 21R so that so that each pair can be opened or closed together. Similarly, each pair of exhaust valves 28F, 28R for controlling the communication and the cutoff with/from the combustion chambers 24F, 24R of the exhaust ports 26F, 26R are arranged in the cylinder heads 21F, 21R so that each pair can be opened or closed together.

Each valve chamber 30F, 30R houses each valve train 29F, 29R for opening or closing each pair of intake valves 27F, 27R and each pair of exhaust valves 28F, 28R. The valve chamber 30F, 30R is formed between each cylinder head 21F, 21R and each head cover 22F, 22R in the front and rear banks BF, BR.

Further, an intake manifold 31 is connected to both cylinder heads 21F, 21R via the intake ports 25F, 25R of the cylinder heads 21F, 21R with which the banks BF, BR are provided. The intake manifold 31 is arranged between the front and rear banks BF, BR.

Figure 3:
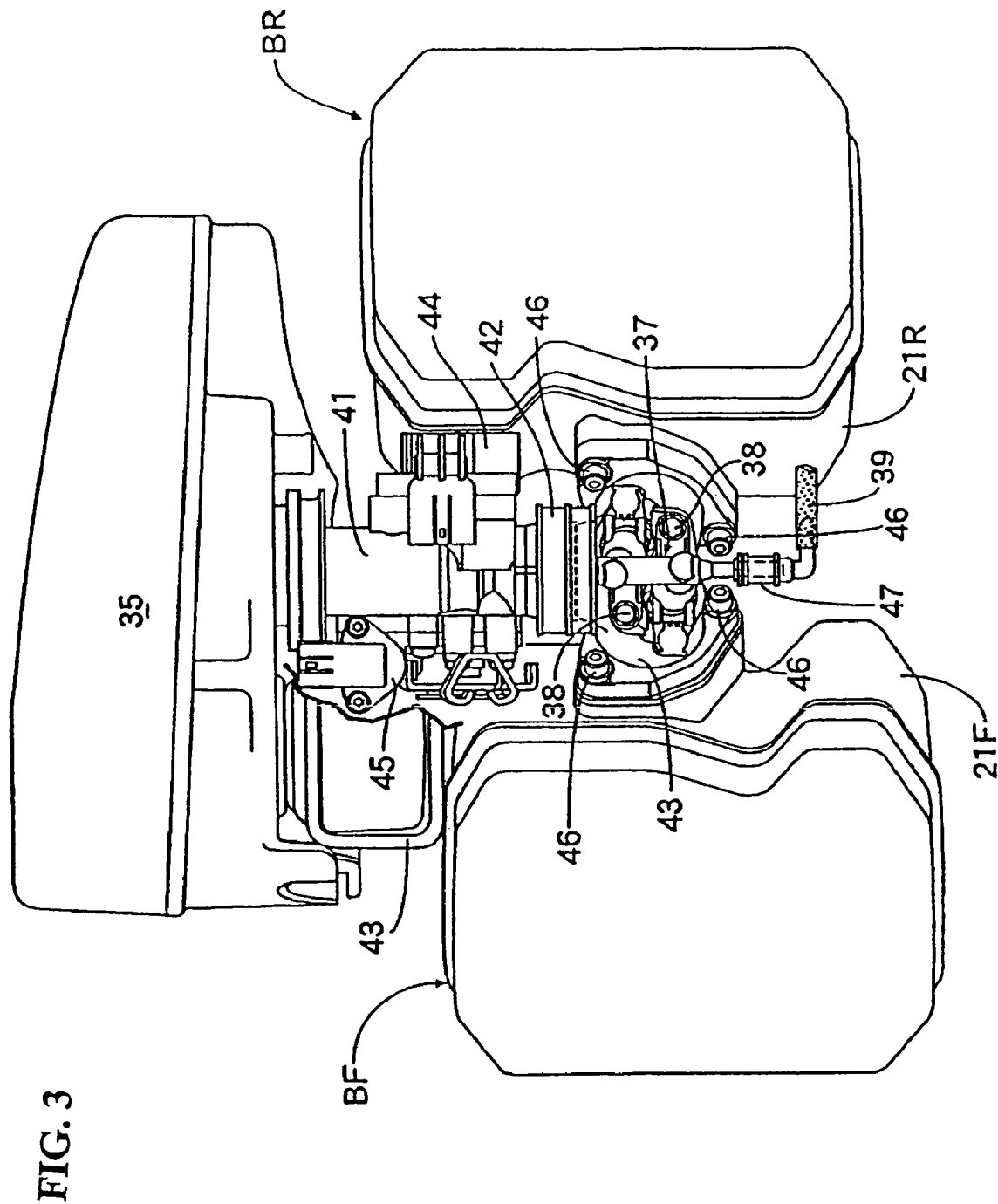
FIG. 3 is a top plan view of the V-type engine of FIGS. 1–2 as seen in a direction shown by an arrow 3 in FIG. 2.

Also referring to FIGS. 3 to 5, the intake manifold 31 has an intake passage 34 formed therein, and includes branched passages 32F, 32R individually communicating with the intake ports 25F, 25R of each bank BF, BR. The intake manifold 31 also includes a common passage 33 communicating with both of the branched passages 32F, 32R, and extending in parallel with the axis of the crankshaft 18. The intake manifold 31 is fastened to the cylinder heads 21F, 21R of the front and rear banks BF, BR by each pair of bolts 46, 46 (FIG. 3).

An air cleaner 35 is connected to the intake manifold 31 via a throttle body 41 and a connecting hose 42, in this order from the upstream side, so that the air cleaner communicates with the common passage 33. An intake duct 43 for leading outside air into the air cleaner 35 is arranged on the side of the front bank BF in a state in which the intake duct is open upward under the fuel tank 9. A sensor unit 44 including a throttle position sensor, an intake pressure sensor, an intake air temperature sensor and an idle control valve 45 are provided on the throttle body 41.

Fuel injection valves 36F, 36R inject fuel individually into the branched passages 32F, 32R and are attached to the intake manifold 31 corresponding to both banks BF, BR. Both fuel injection valves 36F, 36R are attached to an upper part of the intake manifold 31 so that center lines CF, CR of the fuel injection valves 36F, 36R are crossed at an intersection P, over the intake manifold 31, when the body is viewed from the side. In addition, a fuel rail 37 is provided with a fuel passage pipe 37a, the axis of which is arranged at the intersection P. The fuel rail 37 is parallel to the crankshaft 18, is linearly extended, and is connected to both fuel injection valves 36F, 36R in common.

The fuel rail 37 is integrally provided with the fuel passage pipe 37a and a pair of valve connections 37b, 37c fitted to the rear of each fuel injection valve 36F, 36R, in a fluid-tight manner, so that each fuel injection valve 36F, 36R communicates with the fuel passage pipe 37a. The fuel rail 37 is also integrally provided with mounting parts 37d, 37e directly mounted on the upper surface of the intake manifold 31 by bolts 38, 38, and the fuel rail 37 is directly mounted on the upper part of the intake manifold 31.

In addition, a fuel inlet 40 is formed at one end of the fuel passage pipe 37a in the fuel rail 37 so that the fuel inlet is open toward one side, that is a lateral side, of the vehicle body. The fuel inlet 40 is connected to a fuel hose 39 via a quick connector 47. The other end of the fuel passage pipe 37a is closed, and the fuel rail 37 is configured as a deadheaded, returnless structure, in which the return of fuel is disabled.

Next, the action of the fuel routing structure according to the first embodiment hereof will be described. Each fuel injection valve 36F, 36R is attached to the upper part of the intake manifold 31 so that the center lines CF, CR of the fuel injection valves 36F, 36R corresponding to the front and rear banks BF, BR of the V-type two-cylinder engine E are crossed at the intersection P over the intake manifold 31, when the vehicle is viewed from the side. The fuel rail 37, provided with the fuel passage pipe 37a, the axis of which is arranged at the intersection P, which is parallel to the crankshaft 18 and which is linearly extended, is connected to all the fuel injection valves 36F, 36R in common. As seen in the top view of FIG. 4, the fuel injection valves 36F, 36R are spaced laterally apart along the fuel rail 37, in a vehicle width direction. Because the fuel injection valves 36F, 36R are spaced laterally apart along the fuel rail, upper end portions of the fuel injection valves are permitted to overlap one another when viewed from a lateral side of the vehicle, as seen in FIG. 5. As a result, fuel is supplied to each fuel injection valve 36F, 36R using the fuel rail 37 such that the number of parts are reduced and the fuel rail 37 is made compact by connecting the single fuel rail 37 to both of the fuel injection valves 36F, 36R corresponding to both banks BF, BR. In addition, since the fuel rail 37 is connected to each fuel injection valve 36F, 36R over the intake manifold 31, ease of assembly and in maintenance can be enhanced.

Because the fuel rail 37 is directly attached to the intake manifold 31, a separate dedicated member for supporting the fuel rail 37 is not required, and the number of parts is further reduced.

In addition, the intake passage 34 formed in the intake manifold 31 is configured by the branched passages 32F, 32R individually communicating with the intake ports 25F, 25R and the common passage 33 communicating with both branched passages 32F, 32R. The axis of the common passage 33 is arranged in parallel with the axis of the fuel passage pipe 37a with which the fuel rail 37 is provided. As a result, the attachment and the detachment of the fuel rail 37 to/from the intake manifold 31 are facilitated, and operability in assembly and in maintenance is further enhanced.

The fuel inlet 40 to which the fuel hose 39 is to be connected is open toward one side of the vehicle and is formed at one end of the fuel passage pipe 37a. As a result, not only the connection structure to the fuel rail 37 of the fuel hose 39 is facilitated, but work for connecting the fuel hose 39 to the fuel rail 37 is also facilitated.

Further, the fuel rail 37 is integrally provided with the fuel passage pipe 37a, one end of which is the fuel inlet 40, and the other of which is closed. The fuel rail is also provided with the plural valve connections 37b, 37c, which connect each fuel injection valve 36F, 36R to the fuel passage pipe 37a, and to which the rear of each fuel injection valve 36F, 36R is fitted in a fluid-tight manner. Moreover, the fuel rail 37 is configured as a deadheaded, returnless structure in which the return of fuel is disabled. As a result, a return pipe is not required by eliminating the return of fuel from the fuel rail 37, and the resulting fuel routing structure is simplified and compact.

FIGS. 6 and 7 show a second embodiment of the invention. In the figures and following description of this embodiment, the same reference numeral is allocated to the similar component to that in the first embodiment, and the detailed description is omitted.

An intake manifold 31' forms an intake passage 34 configured by branched passages 32F, 32R individually communicating with intake ports 25F, 25R (refer to the first embodiment shown in FIGS. 1 to 5) of each bank BF, BR, and a common passage 33 which communicates with both of the branched passages 32F, 32R, and which extends in parallel with the axis of a crankshaft 18 (refer to the first embodiment shown in FIGS. 1 to 5). Fuel injection valves 36F, 36R for individually injecting fuel into each branched passage 32F, 32R are attached to the intake manifold 31'.

In addition, both fuel injection valves 36F, 36R are attached to an upper part of the intake manifold 31' so that center lines CF, CR of the fuel injection valves 36F, 36R are crossed at an intersection P over the intake manifold 31' when a vehicle is viewed from the side. A fuel rail 37' is provided with a fuel passage pipe 37a. The axis of fuel passage pipe 37a is arranged at the intersection P, is parallel to the crankshaft 18 and is linearly extended. The fuel passage pipe 37a is connected to both fuel injection valves 36F, 36R in common.

The fuel rail 37' is integrally provided with the fuel passage pipe 37a, a pair of valve connections 37b, 37c which connect each fuel injection valve 36F, 36R to the fuel passage pipe 37a and to which the rear of each fuel injection valve 36F, 36R is fitted in a fluid-tight manner. The fuel rail 37' is also integrally provided with mounting parts 37d, 37e which are directly attached to an upper surface of the intake manifold 31' by bolts 38, 38, and is directly attached to the upper part of the intake manifold 31'.

In this embodiment, the common passage 33 in the intake passage 34 is formed so that its axis is located off the axis of the fuel passage pipe 37a toward the rear of the vehicle, as clearly shown in FIG. 7.

Further, a fuel inlet 40 is formed at one end of the fuel passage pipe 37a in the fuel rail 37, so that the fuel inlet is open to one lateral side of the vehicle and is connected to a fuel hose 39 via a quick connector 47. The other end of the fuel passage pipe 37a is closed, and the fuel rail 37 is configured as a deadheaded, returnless structure in which the return of fuel is disabled.

According to the second embodiment, in addition to an advantage that the similar effect to that of the first embodiment can be produced, the amount of freedom in the layout of the intake passage 34 is increased. In addition, the intake manifold 31' and a throttle body 41 (see FIG. 3 in the first embodiment) ranging to the intake passage 34 can be arranged, avoiding interference with the cylinder heads 21F, 21R of both banks BF, BR.

Even if the common passage 33 in the intake passage 34 is formed so that the axis is arranged in a position off the axis of the fuel passage pipe 37a toward the rear of the vehicle differently from FIG. 7, the similar effect can be acquired.

FIG. 8 shows a third embodiment of the invention. In the figures and following description of this embodiment, the same reference numeral is allocated to the similar component to that in the first and second embodiments, and the detailed description is omitted.

The body 17' of a V-type two-cylinder engine E' is provided with a crankcase 8' supporting a crankshaft 18' so that the crankshaft can be rotated. A pair of front and rear cylinder blocks 20F', 20R' are arranged in a V-shape opening upwardly, and are connected to the crankcase 8'. Cylinder heads 21F', 21R' are connected to each cylinder block 20F', 20R' and head covers 22F', 22R' are connected to the upper ends of the cylinder heads 21F', 21R'. A front bank BF' is configured by the cylinder block 20F', the cylinder head 21F' and the head cover 22F', and a rear bank BR' is configured by the cylinder block 20R', the cylinder head 21R' and the head cover 22R' to form a V type at a small angle a of approximately 52° for example, and are coupled to the crankcase 8'.

An intake manifold 51, connected to both cylinder heads 21F', 21R', is arranged between the front and rear banks BF', BR' so that the intake manifold 51 communicates with intake ports 25F', 25R' of the cylinder heads 21F', 21R' with which the banks BF', BR' are provided.

The intake manifold 51 has an intake passage 54 formed therein, configured by branched passages 52F, 52R individually communicating with the intake ports 25F', 25R' of each bank BF', BR'. The intake manifold 51 also includes a common passage 53 communicating with both of the branched passages 52F, 52R, and extended in parallel with the axis of the crankshaft 18'. The intake manifold 51 is connected to the cylinder heads 21F', 21R' of the front and rear banks BF', BR' via insulators 55F, 55R.

Fuel injection valves 36F, 36R for injecting fuel to each branched passage 52F, 52R are attached to the intake manifold 51 corresponding to both banks BF', BR'. Both fuel injection valves 36F, 36R are fitted and attached to an upper part of the intake manifold 51 in a fluid-tight manner, so that center lines CF, CR of the fuel injection valves 36F, 36R are crossed at an intersection P over the intake manifold 51 when a vehicle is viewed from the side.

A fuel rail 57 is provided with a fuel passage pipe 57a. The axis of fuel passage pipe 57a is arranged in the vicinity of the intersection P, is parallel to the crankshaft 18' and extends linearly. The fuel passage pipe 57a is directly attached to the upper part of the intake manifold 51, and the fuel rail 57 is arranged so that the axis of the fuel passage pipe 57a is located in a position off the axis of the common passage 53 in the intake passage 54 toward the rear of the vehicle and in a position off the axis of the crankshaft 18' toward the front of the vehicle.

Valve connections 57b, 57c with which the fuel rail 57 is provided are fitted to the rears of both fuel injection valves 36F, 36R in a fluid-tight manner. A fuel hose 39 (refer to the first and second embodiments) is connected to one end of the fuel passage pipe 57a, and the other end of the fuel passage pipe 57a is closed.

According to the third embodiment, the amount of freedom in the layout of the fuel rail 57 can be increased, and the fuel rail 57 can be arranged without interfering with a fuel tank 9 (see FIG. 1 in the first embodiment) arranged over the engine E' or the other vehicle components.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

What is claimed is:

1. A fuel routing structure of a V-type engine for a vehicle, the engine comprising:
   cylinder heads housed in at least one pair of cylinder banks, the at least one pair of cylinder banks arranged in a V configuration aligned in the longitudinal direction of the vehicle;
   a crankshaft aligned in the transverse direction of the vehicle;
   intake ports formed in the cylinder heads; and
   fuel injection valves;
   the fuel routing structure comprising:
   an intake manifold forming an intake passage communicating with the intake ports of the cylinder heads, the intake manifold arranged between each respective bank of the at least one pair of banks; and
   a fuel rail provided with a fuel passage pipe, wherein
   the fuel injection valves inject fuel into the intake passage corresponding to each intake port,
   the fuel injection valves being attached to an upper part of the intake manifold so that center lines of the fuel injection valves corresponding to each respective bank of the at least one pair of banks are crossed at an intersection over the intake manifold when the vehicle is viewed from the side; and
   the axis of the fuel passage pipe is arranged in the vicinity of the intersection, is parallel to the crankshaft and extends linearly, and the fuel rail is connected to all the fuel injection valves in common and is directly attached to the intake manifold, and
   the fuel injection valves are spaced laterally apart along the fuel rail, and are oriented such that upper end portions thereof overlap one another when viewed from a lateral side of the vehicle.

2. The fuel routing structure of a V-type engine for a vehicle according to claim 1, wherein:
   the intake passage comprises:
      a single common passage; and
      branched passages branching from the common passage, a branched passage individually communicating with each intake port; and the common passage communicating with the branched passages in common, wherein the axis of the common passage is arranged in parallel with the axis of the fuel passage pipe.

3. The fuel routing structure of a V-type engine for a vehicle according to claim 1, wherein:
a fuel inlet to which a fuel hose is to be connected is formed at one end of the fuel passage pipe so that the fuel inlet is open to one lateral side of the vehicle.

4. The fuel routing structure of a V-type engine for a vehicle according to claim 3, wherein:
the fuel rail is integrally provided with the fuel passage pipe such that one end of fuel passage pipe comprises the fuel inlet and the other end of the fuel passage pipe is closed, and plural valve connections connect the rear end of each fuel injection valve to the fuel passage pipe, the plural valve connections being fluid-tight.

5. The fuel routing structure of a V-type engine for a vehicle according to claim 1, wherein:
the axis of the crankshaft is in substantial vertical alignment with both an axis of the common passage and the intersection.

6. The fuel routing structure of a V-type engine for a vehicle according to claim 1, wherein:
an axis of the of the common passage is positioned rearward of the intersection with respect to the forward driving direction of the vehicle.

7. The fuel routing structure of a V-type engine for a vehicle according to claim 1, wherein:
an axis of the of the common passage is positioned forward of the intersection, and the intersection is positioned forward of the axis of the crankshaft, with respect to the forward driving direction of the vehicle.

8. A fuel routing structure of a V-type engine for a vehicle, the engine comprising:
cylinder heads housed in at least one pair of cylinder banks, the at least one pair of cylinder banks arranged in a V configuration aligned in the longitudinal direction of the vehicle;
a crankshaft aligned in the transverse direction of the vehicle;
intake ports formed in the cylinder heads; and
fuel injection valves, a fuel injection valve provided for each intake port;
the fuel supply structure comprising:
an intake manifold forming intake passages communicating with the intake ports of the cylinder heads, the intake manifold arranged between each respective bank of the at least one pair of banks; and
a single fuel rail provided with a fuel passage pipe, wherein
the fuel injection valves inject fuel into the intake passage corresponding to each intake port,
the fuel injection valves being attached to an upper part of the intake manifold so that center lines of the fuel injection valves corresponding to each respective bank of the at least one pair of banks are crossed at an intersection overlying the intake manifold when the vehicle is viewed from the side; and
the axis of the fuel passage pipe is arranged in the vicinity of the intersection, is parallel to the crankshaft and extends linearly, and the single fuel rail is connected to all the fuel injection valves in common and is directly attached to the intake manifold, and
the fuel injection valves are spaced laterally apart along the fuel rail, and are oriented such that upper end portions thereof overlap one another when viewed from a lateral side of the vehicle.

9. The fuel routing structure of a V-type engine for a vehicle according to claim 8, wherein:
the intake passage comprises:
a single common passage; and
branched passages branching from the common passage, a branched passage individually communicating with each intake port; and the common passage communicating with the branched passages in common, wherein
the axis of the common passage is arranged in parallel with the axis of the fuel passage pipe.

10. The fuel routing structure of a V-type engine for a vehicle according to claim 8, wherein:
a fuel inlet to which a fuel hose is to be connected is formed at one end of the fuel passage pipe so that the fuel inlet is open to one lateral side of the vehicle.

11. The fuel routing structure of a V-type engine for a vehicle according to claim 10, wherein:
the fuel rail is integrally provided with the fuel passage pipe such that one end of fuel passage pipe comprises the fuel inlet and the other end of the fuel passage pipe is closed, and plural valve connections connect the rear end of each fuel injection valve to the fuel passage pipe, the plural valve connections being fluid-tight.

12. The fuel routing structure of a V-type engine for a vehicle according to claim 8, wherein:
the axis of the crankshaft is in substantial vertical alignment with both an axis of the common passage and the intersection.

13. The fuel routing structure of a V-type engine for a vehicle according to claim 8, wherein:
an axis of the of the common passage is positioned rearward of the intersection with respect to the forward driving direction of the vehicle.

14. The fuel routing structure of a V-type engine for a vehicle according to claim 8, wherein:
an axis of the of the common passage is positioned forward of the intersection, and the intersection is positioned forward of the axis of the crankshaft, with respect to the forward driving direction of the vehicle.

* * * * *